Sept. 15, 1970  B. L. TIBBETTS  3,528,561
APPARATUS FOR BURTONING CARGO
Filed May 16, 1968  2 Sheets-Sheet 1

INVENTOR.
BERNARD L. TIBBETTS
BY Fulwider, Patton, Rieber, Lee and Utecht
ATTORNEYS

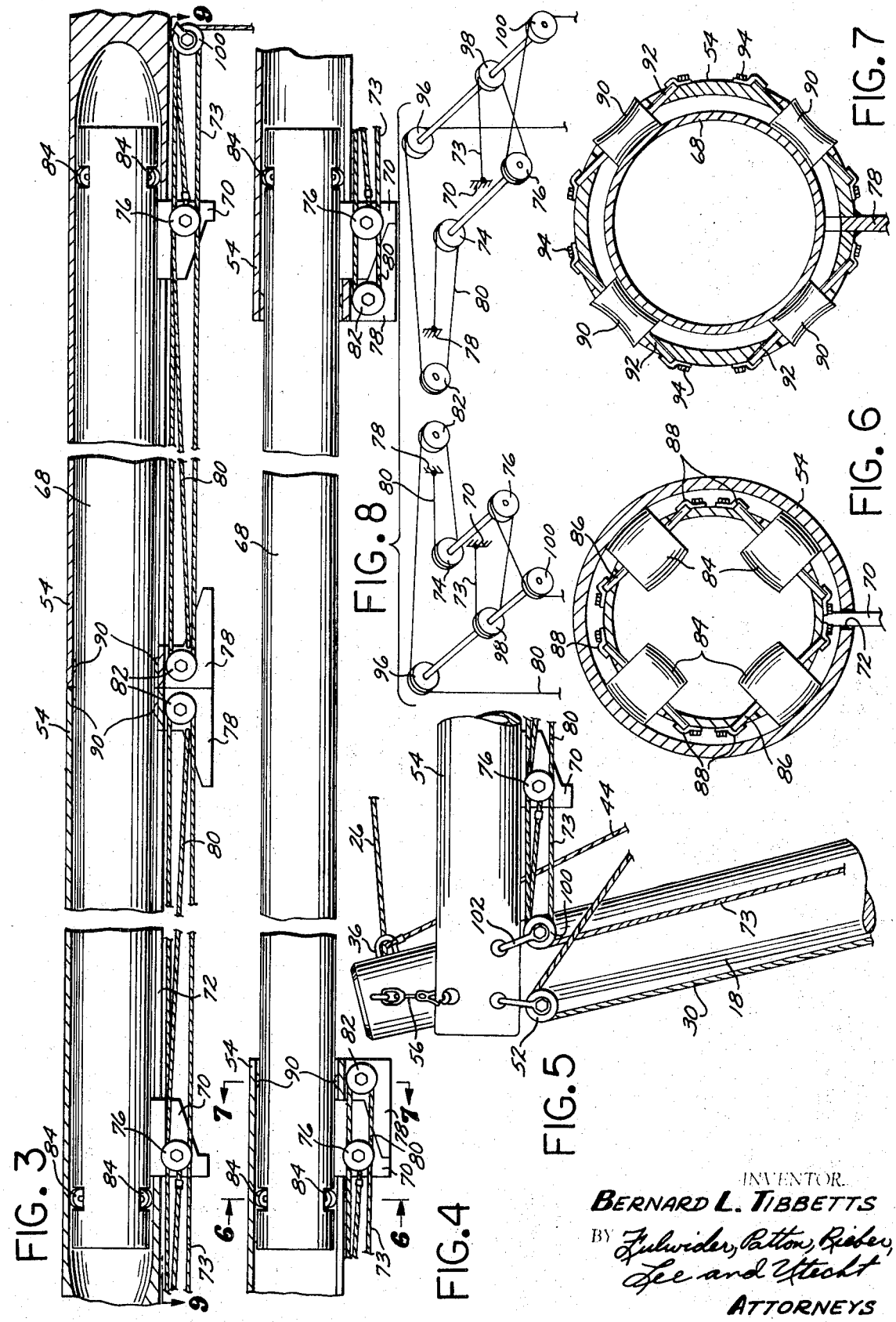

United States Patent Office 3,528,561
Patented Sept. 15, 1970

3,528,561
APPARATUS FOR BURTONING CARGO
Bernard L. Tibbetts, 11392 Reagan St.,
Los Alamitos, Calif. 90720
Filed May 16, 1968, Ser. No. 729,710
Int. Cl. B66c 23/52
U.S. Cl. 212—3                                 4 Claims

ABSTRACT OF THE DISCLOSURE

In apparatus for burtoning cargo, an elongated coupler disposed between the outer ends of the booms for maintaining them in spaced relation to thereby eliminate the offshore guy and increase the cargo handling capacity of the apparatus.

BACKGROUND OF THE INVENTION

Field of the invention

The present invention relates to apparatus for loading and discharging cargo, and more particularly to an improved apparatus for burtoning cargo.

Description of the prior art

The burton rig is the usual and fastest system used by merchant ships for loading and discharging cargo. The burton system, which is sometimes also referred to as the married fall system or the yard and stay system, includes a pair of booms having their inner extremities or heels arranged in spaced-apart relation and pivotally carried by a pair of masts on a mast house, or the like, or located at the base of a single mast. A pair of lines or topping lifts extend from the tops of the masts to the outer extremities of the booms and are operable to vertically move the booms.

Sidewise or swinging movement of the booms during a cargo handling operation is prevented by lines or guys extending from the outer extremities of the booms to points of securement on the ship's bulwark rail or the like. These guys are under considerable stress, particularly the outboard or offshore guy during the hoisting of heavy loads or whenever the fall angle becomes too great.

The usual burton cargo handling rig also includes a pair of cargo falls which are married or secured together and support a cargo handling hook or the like at their junction. The cargo falls are trained about suitable sheaves or head blocks on the outer extremities of the booms, along the lengths of the booms to heel blocks, and then to winches which are operative to raise and lower the falls. Pulling in on one fall and simultaneously letting go the opposite fall moves the cargo hook transversely, while letting go or pulling in both falls will lower and raise the cargo hook, respectively, as will be apparent.

In such a burton rig the strain on the offshore guy is critical, so critical that the cargo handling capacity of the whole apparatus is generally limited by the capacity of the offshore guy to take this strain, which becomes increasingly more severe as the fall angle increases.

Moreover, in a burton rig, as compared to a swinging boom rig, the stresses on the boom also often become critical. That is, the increased vertical component of the stresses on the offshore guy in combination with the increased horizontal component of the stresses on the cargo falls, together with the compressive force of the load itself, places increased compressive forces on the boom. The safe compressive forces which can be borne by a boom are specified by most national authorities on the basis of tests of a swinging boom arrangement. Therefore no safe load is generally specified for the boom used in the burton system, and stevedores and others often overstress booms when burtoning cargoes.

With those versed in the art of rigging cargo gear, the safe working load for the two booms of a burton system is usually 50% of the rated safe working load of one swinging boom for light booms, and varies from 40% to 60% of the safe working load for heavier booms.

The reduced capacities of the usual burton system, as noted above, requires hand handling of cargo in the ships hold, which is costly and time consuming, thereby resulting in longer port time for the ship. The longer port time results in higher demurrage and other cost items to the ship owners, shippers, and consignees of ocean freight.

Except for the more experienced seamen and stevedores, few men involved in a burtoning operation completely understand the severity of stresses arising because of improper procedures. Consequently, failure of the cargo gear is not uncommon, resulting in cargo damage, loss of time, sometimes injury to personnel, and expenses for replacement of the failed gear. Experienced judgment is vital to foresee if a cargo handling procedure is apt to cause failure of the burton rig, and too often such experience is not available.

SUMMARY OF THE INVENTION

According to the present invention, the usual burton rig is utilized but with important modifications to increase the cargo handling capacity of the rig. More particularly, an elongated member or coupler is interposed between the outer extremities of the pair of cargo handling booms to constrain the booms against movement toward one another. The coupler is placed in compression during burtoning of the cargo and the consequent increase in the angle between the falls. The coupler assumes in compression the loads previously borne in large part by the offshore guy, and the cargo handling capacity of the overall rig is significantly increased. The offshore or outboard guy is preferably eliminated completely.

A further refinement of the present invention is the provision of an elongated coupler which is axially collapsible or telescopable to permit the operating angles of the booms to be easily adjusted, and also to enable compact stowage of the coupler when it is not in use. Of course, the coupler is fixed in extended position with the booms during a cargo handling operation.

Other objects and features of the present invention will become apparent from consideration of the following description taken in connection with the accompanying drawings in which:

BRIEF DESCRIPTION OF THE DRAWINGS

FIG. 3 is a enlarged longitudinal cross-sectional view of the coupler in its telescoped position, portions of the coupler being broken away for compactness of illustration;

FIG. 4 is a view identical to the view of FIG. 3, but illustrating the coupler in its extended position;

FIG. 5 is an enlarged detail view illustrating the connection between the coupler and one of the booms;

FIG. 6 is an enlarged view taken along the line 6—6 of FIG. 4;

FIG. 7 is an enlarged view taken along the line 7—7 of FIG. 4;

FIG. 8 is a diagrammatic representation of the arrangement of sheaves and blocks which are operative to manipulate the coupler assembly.

DESCRIPTION OF THE PREFERRED EMBODIMENT

Figure 1:
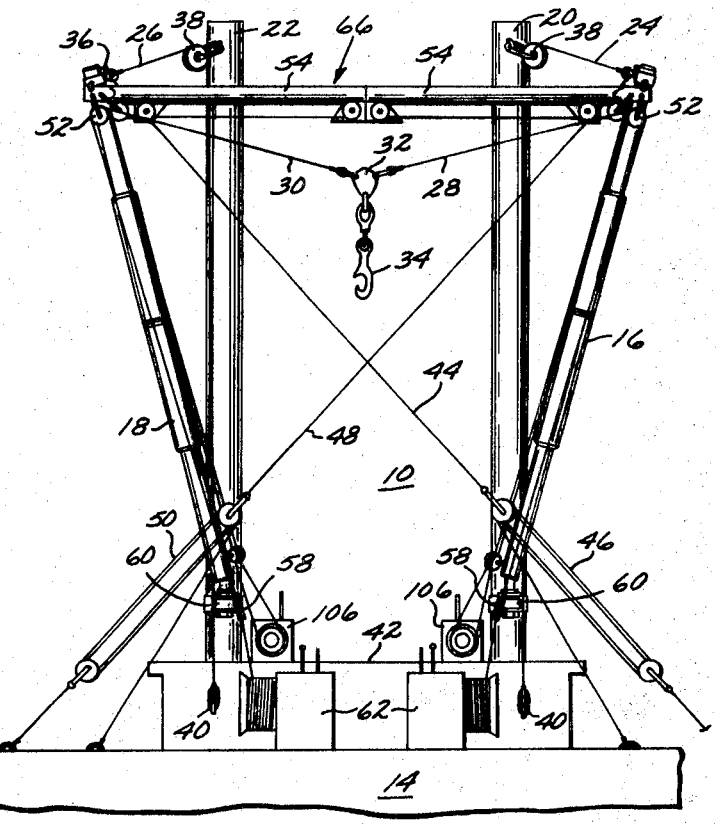
FIG. 1 is a front elevational view of the present apparatus for burtoning cargo, the coupler being illustrated in its fully telescoped or stowed position.
Figure 2:
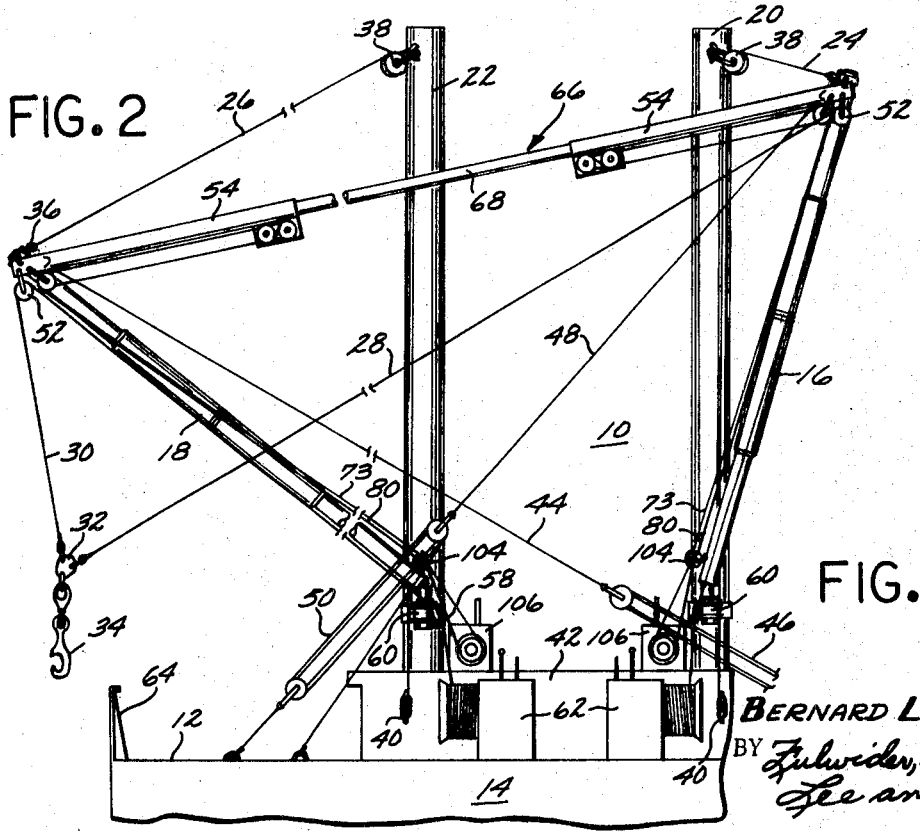
FIG. 2 is a view identical to FIG. 1 but illustrating the coupler in an extended position ready for use.

Referring now to the drawings and particularly to FIGS. 1 and 2, there is illustrated an apparatus 10 for burtoning cargo.

The cargo handling gear or burton rig 10 is shown mounted to the deck 12 of a ship for handling cargo between a hatch, located in the area generally designated by the numeral 14, and a dock (not shown) located to the left of the rig 10, as viewed in FIGS. 1 and 2.

Several variations of the burton rig are being used at the present time, but each of the variations utilizes a pair of booms fixed in position and cooperating with a pair of cargo falls to move a cargo or load athwartship. The burton rig 10 illustrated is therefore merely exemplary of one arrangement for burtoning cargo, although it should be noted that the particular rig 10 is probably the most widely used of the known variations.

The burton rig 10 includes a pair of elongated booms 16 and 18 which are each pivotally carried at their inner extremity or heel at the foot of one of a pair of ship's masts 20 and 22, respectively.

A pair of lines or topping lifts 24 and 26 are operable to pivotally move the booms 16 and 18 vertically, as will be seen.

The transverse positions of the outer extremities of the booms 16 and 18 can also be adjusted, as will be described below, but the booms 16 and 18 are fixed in position during burtoning or athwartships movement of the cargo or load.

A pair of cargo runners or hatch and dock falls 28 and 30 also form a part of the rig 10, and are trained along the lengths of the booms 16 and 18, respectively. The falls are joined or married at a junction, generally indicated at 32, being secured to a suitable fitting which mounts a cargo hook 34 or the like.

In raising and lowering cargo relative to the hatch 14, the hatch fall 28 constitutes the up and down fall, while the dock or yard fall 30 is used to pull the load during such movement across the ship. The hatch fall or dock fall take the entire load during raising and lowering of the load relative to the hatch or the dock, respectively.

Each of the topping lifts 24 and 26 is secured to a pad eye (not shown) located on the rear side of the outer extremity of its associated boom, and then is trained through a topping lift block 38 attached to the head of the associated mast 20 or 22, as the case may be. The lift then extends downwardly along the associated mast and is secured to a topping lift cleat 40 on a mast house 42, or to a topping lift winch (not shown) if one is part of the cargo gear.

Transverse or swinging movement of the booms 16 and 18 during a boom location or spotting operation is provided by means of a guying system. The usual burton rig includes outboard guys (not shown), as is well known to those skilled in the art. However, the present rig 10, and particularly the coupler 66 thereof, makes possible elimination of such outboard guys and use only of inboard guys, as will be seen.

Each of the runners or cargo falls 28 and 30 is trained through a head block 52 which, as best viewed in FIG. 5, is mounted to the outer extremity of one of a pair of elongated cylindrical coupler sleeves 54 which are secured to the heads of the booms 16 and 18, respectively, by any suitable means, such as by swivel and shackle assemblies 56. The hauling part of each cargo fall is trained along the associated boom and through a heel block 58 which is attached to a gooseneck 60 which pivotally secures the inner extremity of the associated boom to the foot of its mast. The hauling part is then trained about the drum of a cargo winch 62 which is operative to haul in and pay out the fall.

In operation of the present rig 10, the booms 16 and 18 are first located in position to enable the cargo hook 34 to be lowered into the hatch 14. More particularly, after the up and down boom 16 is lowered by paying out the topping lift 24 so that its head is above the general fore and aft area of the hatch, the lower end of the inboard guy 48 is secured to its fittings (not shown) on the deck 12 or on other permanent structure such as a deck house. The inboard guy 48 then is made taut by hauling on the tackle 50 so that the boom 16 is in the athwartship position above the aforementioned cargo landing or hoisting area.

The yard or burton boom 18 is next lowered by paying out the topping lift 26 while simultaneously extending the coupler assembly 66, as will be detailed later.

When the burton or yard boom 18 is above the desired landing or hooking-on area of the dock, the lower end of the inboard guy 44 is secured to its deck or other fittings. The tackle 46 is then made taut by hauling in, thereby rendering the booms 16 and 18 immovable, with the coupler 66 suspended between them so that there is no athwartship movement of the unit as a whole, as best shown in FIG. 2. The cargo or load is hoisted by hauling in on the falls 28 and 30 until the load carried by the hook 34 is above the level of the hatch 14 and the bulwark 64. The fall 30 is then hauled in and the fall 28 payed out until the hook 34 and its load are moved athwartship and over the dock. The load is then lowered and unloaded, and the cycle repeated, as will be apparent.

Failure of the booms and offshore guys in a burton system accounts for the great majority of breakdowns, particularly when loads are tightlined so as to develop a large angle between the falls. In such a situation the tension on the falls 28 and 30 tends to move the heads of the booms 16 and 18 together, developing an extremely high stress on the offshore outboard guy (not shown). The horizontal component of the tension on the falls, and consequently the vertical component of the stresses on the outboard guy, increase as the fall angle increases. In addition, the boom compressive force increases, as noted previously.

Elimination of the offshore guy is made possible by utilizing an elongated coupler means or assembly 66 interposed between the heads of the booms 16 and 18.

The coupler sleeves 54 form the opposite extremities of the assembly 66, each of the sleeves 54 being secured to the head of the associated boom by one of the swivel and shackle assemblies 56, as previously indicated. An elongated intermediate or central coupler member 68 of cylindrical configuration is coaxially arranged and telescopable within the hollow, inwardly disposed extremities of the sleeves 54, as best viewed in FIGS. 3 through 7.

The coupler assembly 66 is axially immovable during a cargo handling operation to prevent the heads of the booms 16 and 18 from moving toward one another. However, the telescoping capability is utilized prior to or after such an operation to adjust the length of the coupler assembly 66 and thereby allow variation or adjustment of the angles of the booms 16 and 18.

The structure enabling telescoping of the assembly 66 will next be described. More particularly, a pair of brackets 70 are welded or otherwise rigidly secured to the outer extremities of the intermediate coupler member 68, the brackets 70 projecting downwardly through elongated, complemental slots 72 provided in and extending axially of the sleeves 54. As diagrammatically illustrated in FIG. 8, one end of a retraction line 73 is secured to the bracket 70, and a pair of blocks 74 and 76 are also mounted to the bracket 70.

Figure 9:
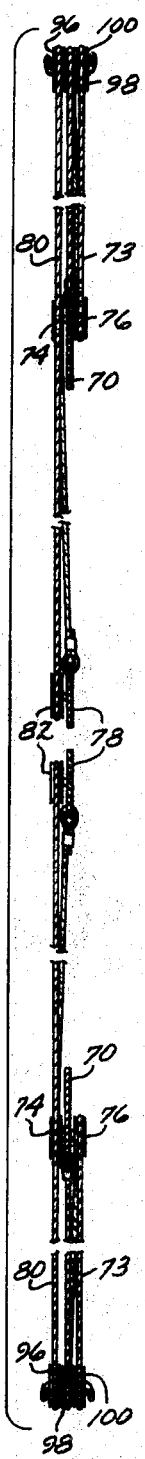
FIG. 9 is a view taken along the line 9—9 of FIG. 3.

A pair of analogous brackets 78 are welded or otherwise rigidly secured to the inwardly disposed extremities of the coupler sleeve 54, and are adapted to abut when the coupler assembly is fully telescoped or retracted, as best viewed in FIG. 3. In the fully extended position of the assembly 66, each bracket 78 is complementally engaged upon its associated bracket 70, as best viewed in FIG. 4 and the coupler becomes a rigid member. Each bracket 78 carries one end of an extension line 80, and also rotatably mounts a single sheave 82, as diagrammatically illustrated in FIGS. 8 and 9.

Extension and retraction of the coupler member 68 relative to the coupler sleeve 54 is facilitated by an arrangement of rollers. More particularly, two sets of four rollers 84 are equally circumferentially spaced about the opposite extemities of the intermediate coupler member 68, respectively, and bear against the adjacent inner surfaces of the encompassing sleeves 54. Each roller 84 includes a generally convex face for this purpose, and is rotatably secured in position by any suitable means, such as upon a shaft 86 whose opposite extremities are rigidly clamped in position upon the coupler member 68 by a pair of bolt and clamp assemblies 88.

In similar fashion the inward extremities of the pair of sleeves 54 mount two sets of four rollers 90 each, the rollers being equally circumferentially spaced about the interior of the sleeve extremities. Each roller 90 is characterized by a generally concave face for engagement with the coupler member 68, and is rotatable upon a shaft 92 which is mounted by any suitable means to the associated coupler sleeve 54, as by a pair of bolt and clamp assemblies 94.

Assuming that it is desired to move the components of the rig 10 from the stowage positions of FIGS. 1 and 3 to the operative positions in FIGS. 2 and 4, the pair of extension lines 80 are hauled in while the retraction lines 73 are payed out. To accomplish this the hauling part of each extension line 80 extends from the bracket 78 and is trained about the sheaves 74 and 82, and a sheave 96 of a triple block which also includes sheaves 98 and 100. This triple sheave block is mounted to the outer extremity of the associated coupler sleeve 54 by means of a conventional shackle 102. From the sheave 96, the extension line 80 is trained along the length of the associated boom 16 or 18, as the case may be, through a sheave (not shown) of a double sheave block 104 which is mounted to the inner extremity of the associated boom, and then about one drum of the pair of drums of an extension winch 106.

With this arrangement, operation of the pair of winches 106 hauls in both extension lines 80, which urges the brackets 70 outwardly from their positions of FIG. 3 toward their positions illustrated in FIG. 4. During this procedure, as will be seen, the pair of retraction lines 73 are payed out by the other drums of the same pair of winches 106.

Retracting movement of the components of the coupler assembly 66 is effected by hauling in on the pair of retraction lines 73 while paying out the extension lines 80, as will be apparent. This is accomplished by extension of each retraction line 73 from its bracket 70, training the line about the sheaves 98, 76, and 100, and then extending the line 73 generally along the length of the associated boom to the remaining sheave of the double sheave block 104. From the fair lead block 104, each retraction line 73 is trained about the other drum of the winch 106, but in a direction opposite that of the associated extension line 80 so that operation of the winch 106 is effective to haul in the retraction line 73 while simultaneously paying out the line 80. This combined action axially moves the coupler member 68 telescopably within the associated coupler sleeves 54 to effect retraction of the coupler assembly 66. Either one or both of the winches 106 can be operated at a time, as will be apparent. If desired, the winches 106 can be equipped with self tensioning devices that will activate the winches 106, thereby allowing the line 80 to pay out and allow the coupler 66 to retract when predetermined high cargo fall angles are encountered.

In operation, the rig 10 is utilized in a manner identical to the utilization of a conventional burton rig. However, by virtue of the provision of the coupler assembly 66, the heads of the booms 16 and 18 are constrained against movement toward each other during a cargo handling operation, and particularly during tightlining of the cargo and hoisting of capacity loads. Because the cargo handling loads formerly borne by the working guys are instead borne in compression by the coupler assembly 66, the outboard or working guys are eliminated. Boom compression is confined to that imposed by the vertical component of the load itself. This reduces the complexity of the rig and facilitates operation by the stevedores. The extension and retraction capability of the coupler assembly 66 is advantageous in that it permits adjustment of the boom angles as required by the particular cargo handling operation.

The use of the coupler assembly 66 is further advantageous in that it permits the handling of loads, using the burton system, up to the full 100% rated capacity of the ship's gear. That is, it will allow burtoning of loads at the capacity rating of the gear for swinging loads. This enables vessels so equipped to handle heavy vans and unitized loads that must now be handled by costly, time-consuming shoreside hoisting equipment.

Although the drawing depict a cylindrical shape for the coupler assembly 66, it is not restricted to this shape but can be of any configuration adequate to bear the compressive forces placed on it when burtoning cargo, and its own weight when it is fully extended.

The mechanism used for extending and retracting the coupler assembly is shown in the drawings as a system of lines, sheaves, blocks and winches. However, other means can be used, such as hydraulic rams and the like, which are consistent with the strength and weight restrictions of the particular application.

Various modifications and changes may be made with regard to the foregoing detailed description without departing from the spirit of the invention or the scope of the following claims.

I claim:

1. In combination with cargo handling gear which includes a pair of married cargo falls carried by blocks adjacent the heads of a pair of booms for burtoning a cargo between the boom heads, the improvement comprising:
   elongated coupler means disposed between and supported by the heads of said booms and fixing said heads in spaced relation whereby said coupler means is placed under compression upon a strain being taken on the cargo falls, said coupler means comprising an elongated intermediate member; a pair of elongated end members connected to the heads of said booms, respectively, and telescopably mounted to the opposite extremities of said intermediate member; and means operative to axially extend and retract said end and intermediate members relative to one another whereby the orientation of said booms may be adjusted, said means being further operative to constrain said end and intermediate members against axial movement during said burtoning.

2. The combination according to claim 1 wherein said intermediate and said end members are coaxially arranged, and including rollers interposed between said intermediate member and said end members to facilitate telescopable movement therebetween.

3. The combination according to claim 1 wherein said last-mentioned means comprises sheaves rotatably mounted to the confronting extremities of said intermediate member and said end members; and lines extending between and trained about said sheaves for relative extension and retraction thereof upon hauling in and paying out of certain of said lines, said lines being trained substantially along the axes of said coupler means and said pair of booms.

4. In combination with cargo handling gear which includes a pair of married cargo falls carried by blocks adjacent the heads of a pair of booms for burtoning a cargo between the boom heads, the improvement comprising:

elongated coupler means disposed between and supported by the heads of said booms and fixing said heads in spaced relation whereby said coupler means is placed under compression upon a strain being taken on the cargo falls; elongated intermediate means having opposite extremities; a pair of elongated end members connected to the heads of said booms, respectively, and telescopably mounted to said opposite extremities of said intermediate means; and means operative to axially extend and retract said end and intermediate means relative to one another whereby the orientation of said booms may be adjusted, said means being further operative to constrain said end members and said intermediate means against axial movement during said burtoning.

References Cited

UNITED STATES PATENTS

| | | | |
|---|---|---|---|
| 2,354,182 | 7/1944 | Christoffersen | 212—3 |
| 3,429,453 | 2/1969 | Kahle | 212—3 |

FOREIGN PATENTS

| | | |
|---|---|---|
| 1,175,571 | 8/1964 | Germany. |
| 1,209,042 | 2/1960 | France. |

HARVEY C. HORNSBY, Primary Examiner

U.S. Cl. X.R.

212—47, 58, 144